United States Patent
Wu

(10) Patent No.: US 9,569,024 B2
(45) Date of Patent: Feb. 14, 2017

(54) DISPLAY MODULE WITH HEAT DISSIPATION STRUCTURE AND HANDHELD DEVICE THEREOF

(71) Applicant: ASIA VITAL COMPONENTS CO., LTD., New Taipei (TW)

(72) Inventor: Chun-Ming Wu, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 63 days.

(21) Appl. No.: 14/538,823

(22) Filed: Nov. 12, 2014

(65) Prior Publication Data

US 2016/0135331 A1   May 12, 2016

(51) Int. Cl.
| | |
|---|---|
| G06F 3/00 | (2006.01) |
| G06F 3/041 | (2006.01) |
| H04M 1/02 | (2006.01) |

(52) U.S. Cl.
CPC ............ *G06F 3/041* (2013.01); *G06F 3/0412* (2013.01); *H04M 1/0266* (2013.01); *G06F 3/0414* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 8,208,115 B2 * | 6/2012 | Dunn | H05K 7/20972 349/161 |
| 2006/0132699 A1 * | 6/2006 | Cho | F04D 29/582 349/161 |
| 2008/0092456 A1 * | 4/2008 | Millett | C09K 9/02 52/1 |
| 2013/0083401 A1 | 4/2013 | Hsuan et al. | |
| 2015/0029658 A1 * | 1/2015 | Yairi | G06F 1/20 361/679.47 |
| 2016/0037681 A1 * | 2/2016 | Lee | H04B 1/036 455/556.1 |

FOREIGN PATENT DOCUMENTS

| | | |
|---|---|---|
| CN | 202750388 U | 2/2013 |
| TW | M469525 U | 1/2014 |
| TW | M473041 U | 2/2014 |
| TW | M476251 U | 4/2014 |
| TW | M476961 U | 4/2014 |
| TW | M482159 U | 7/2014 |
| TW | M487609 U | 10/2014 |

* cited by examiner

*Primary Examiner* — Courtney Smith
*Assistant Examiner* — Zhengfu Feng
(74) *Attorney, Agent, or Firm* — C. G. Mersereau; Nikolai & Mersereau, P.A.

(57) ABSTRACT

A display module with heat dissipation structure and a handheld device thereof. The display module includes a touch panel, a display panel and a vapor chamber. One face of the display panel is correspondingly attached to the touch panel, while the other face of the display panel is correspondingly attached to the vapor chamber. The vapor chamber serves to support the touch panel and the display panel. Moreover, the vapor chamber serves to absorb the heat generated by the electronic component and quickly and uniformly spread the heat to dissipate the heat to achieve a heat spreading effect.

10 Claims, 8 Drawing Sheets

DISPLAY MODULE WITH HEAT DISSIPATION STRUCTURE AND HANDHELD DEVICE THEREOF

BACKGROUND OF THE INVENTION

1. Field of the Invention

The present invention relates generally to a display module with heat dissipation structure and a handheld device thereof. The display module has a vapor chamber to replace the back frame of the conventional display module. The vapor chamber can absorb the heat generated by electronic components and quickly and uniformly spread the heat to dissipate the heat.

2. Description of the Related Art

Currently, there are various mobile devices such as tablets and intelligent mobile phones. The internal calculation execution units of the mobile devices have higher and higher operation speed. As a result, the heat generated by these units is greatly increased. In consideration of convenient carriage, these mobile devices have become thinner and thinner. With an intelligent mobile phone taken as an example, the conventional intelligent mobile phone includes a display module, a circuit board, a battery and a frame body. The display module, the circuit board and the battery are sequentially mounted in the frame body. Multiple electronic components (such as central processing unit (CPU), graphic processing unit (GPU), memories and other IC chips) are arranged on the circuit board. The display module is composed of a touch display module and a back frame. The back frame is simply used to receive the touch display module.

When the above electronic components (such as the CPU and the GPU) and the display module generate heat, it often takes place that the heat cannot be uniformly dissipated in time. As a result, the heat will continuously accumulate inside and around the electronic components themselves. This will lead to deterioration of the execution efficiency of the electronic components in the handheld device or even cause failure of the handheld device. Moreover, when a user holds the handheld device to use the same, the skin of the user's hand will contact and attach to outer surface of the frame body. At this time, in the case that the heat continuously locally accumulates inside and around the electronic components themselves and is not quickly and uniformly dissipated, the user's hand will feel uncomfortable due to the heat.

SUMMARY OF THE INVENTION

It is therefore a primary object of the present invention to provide a display module with heat dissipation structure. The display module has a vapor chamber to replace the back frame of the conventional display module. The vapor chamber can absorb the heat generated by electronic components and quickly and uniformly spread the heat to dissipate the heat.

It is a further object of the present invention to provide a handheld device including a display module with heat dissipation structure. The display module has a vapor chamber to replace the back frame of the conventional display module. The vapor chamber can absorb the heat generated by electronic components and quickly and uniformly spread the heat to dissipate the heat.

To achieve the above and other objects, the display module with heat dissipation structure of the present invention includes a touch display panel and a vapor chamber. The touch display panel includes a touch panel and a display panel. The touch panel has a touch face and a bottom face opposite to the touch face. The bottom face of the touch panel is connected with one face of the display panel. The touch panel is positioned on upper side of the display panel. The vapor chamber has a first side and a second side opposite to the first side. The first side of the vapor chamber is attached to the other face of the display panel. The vapor chamber serves to support the touch panel and the display panel. Moreover, the vapor chamber serves to absorb the heat generated by the electronic component and quickly and uniformly spread the heat to dissipate the heat to effectively achieve a heat spreading effect.

The handheld device of the present invention includes a display module, an electronic component assembly and a frame body. The display module includes a touch display panel and a vapor chamber. The touch display panel includes a touch panel and a display panel. The display panel is disposed between the touch panel and the vapor chamber. The touch panel has a touch face and a bottom face opposite to the touch face. The bottom face of the touch panel is attached to one face of the display panel. The touch panel is positioned on upper side of the display panel. The vapor chamber has a first side and a second side opposite to the first side. The first side of the vapor chamber is attached to the other face of the display panel. One side of the electronic component assembly is attached to the second side of the vapor chamber. The frame body has a receiving space. One side of the frame body is recessed to form the receiving space for receiving the electronic component assembly and the display module. The other side of the electronic component assembly is attached to a bottom side of the receiving space. The vapor chamber serves to support the touch panel and the display panel. Moreover, the vapor chamber serves to absorb the heat generated by the electronic component and quickly and uniformly spread the heat to dissipate the heat to effectively achieve a heat spreading effect. Moreover, a user can hold and use the handheld device more comfortably.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
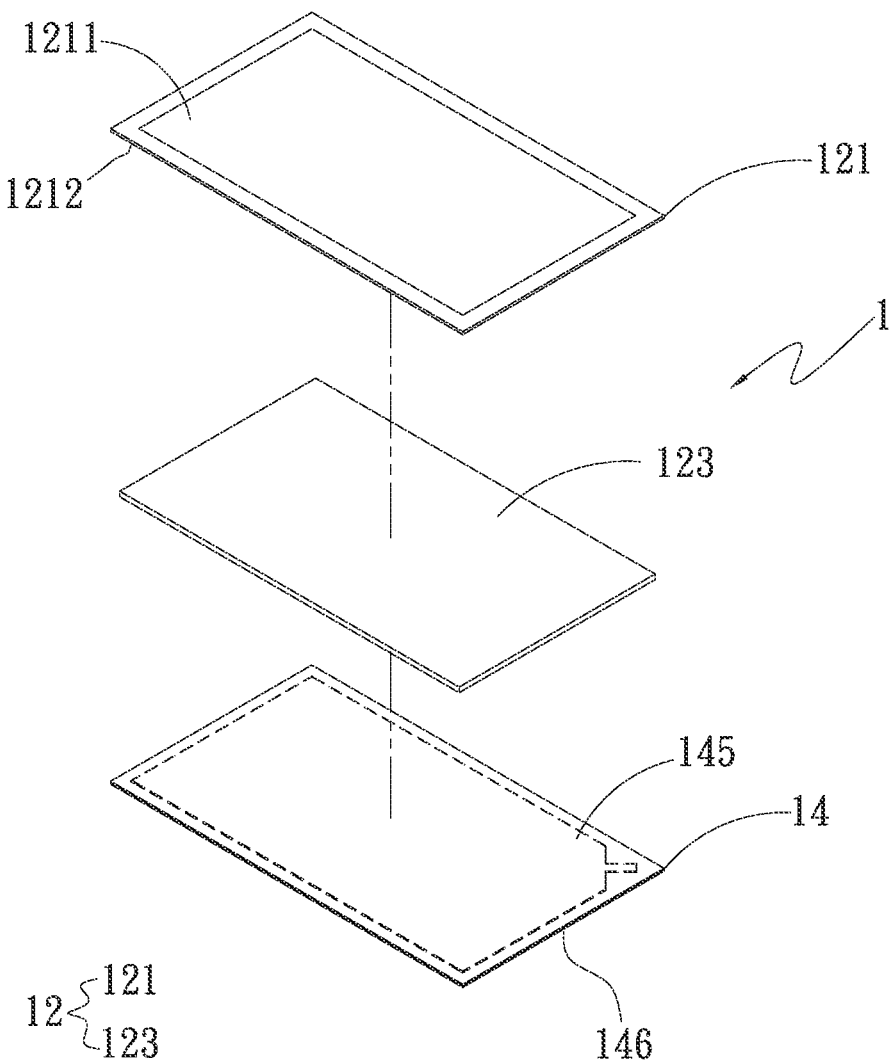
FIG. 1 is a perspective exploded view of a first embodiment of the present invention.
Figure 2:
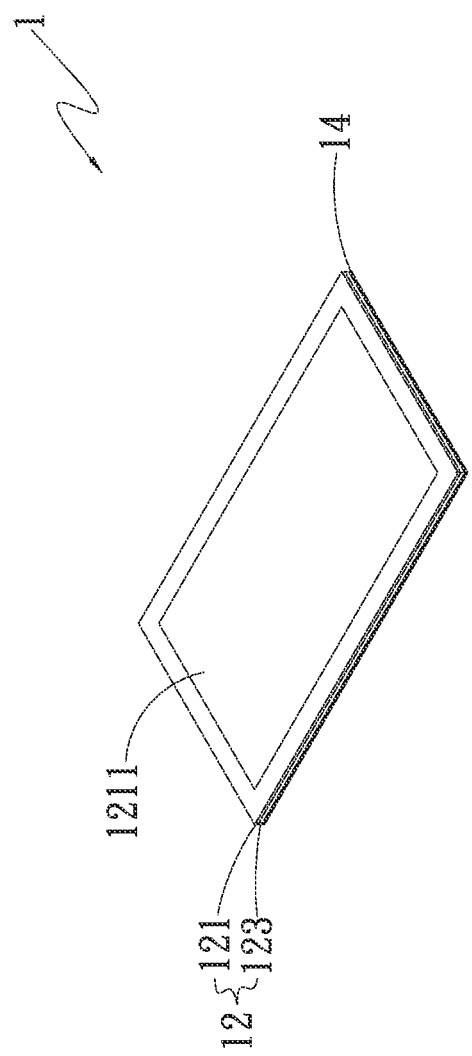
FIG. 2 is a perspective assembled view of the first embodiment of the present invention.
Figure 3A:
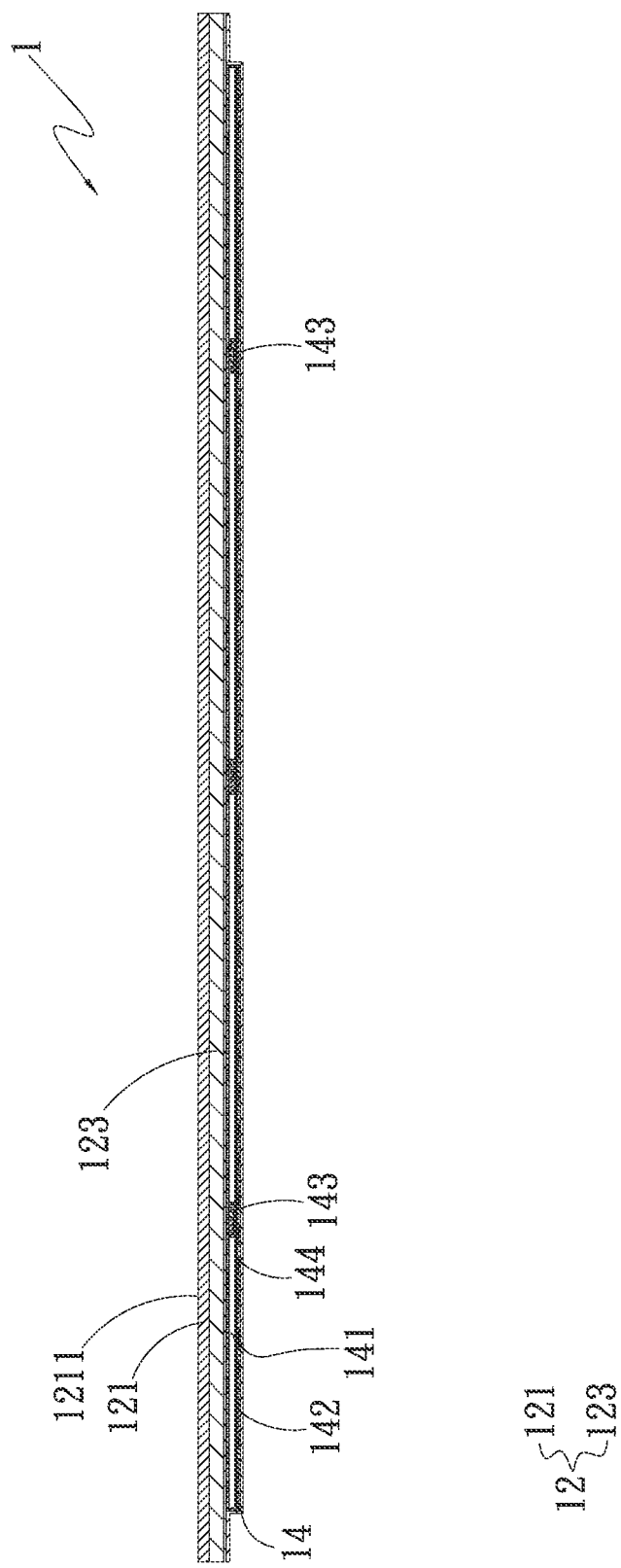
FIG. 3A is a sectional assembled view of the first embodiment of the present invention.
Figure 3B:
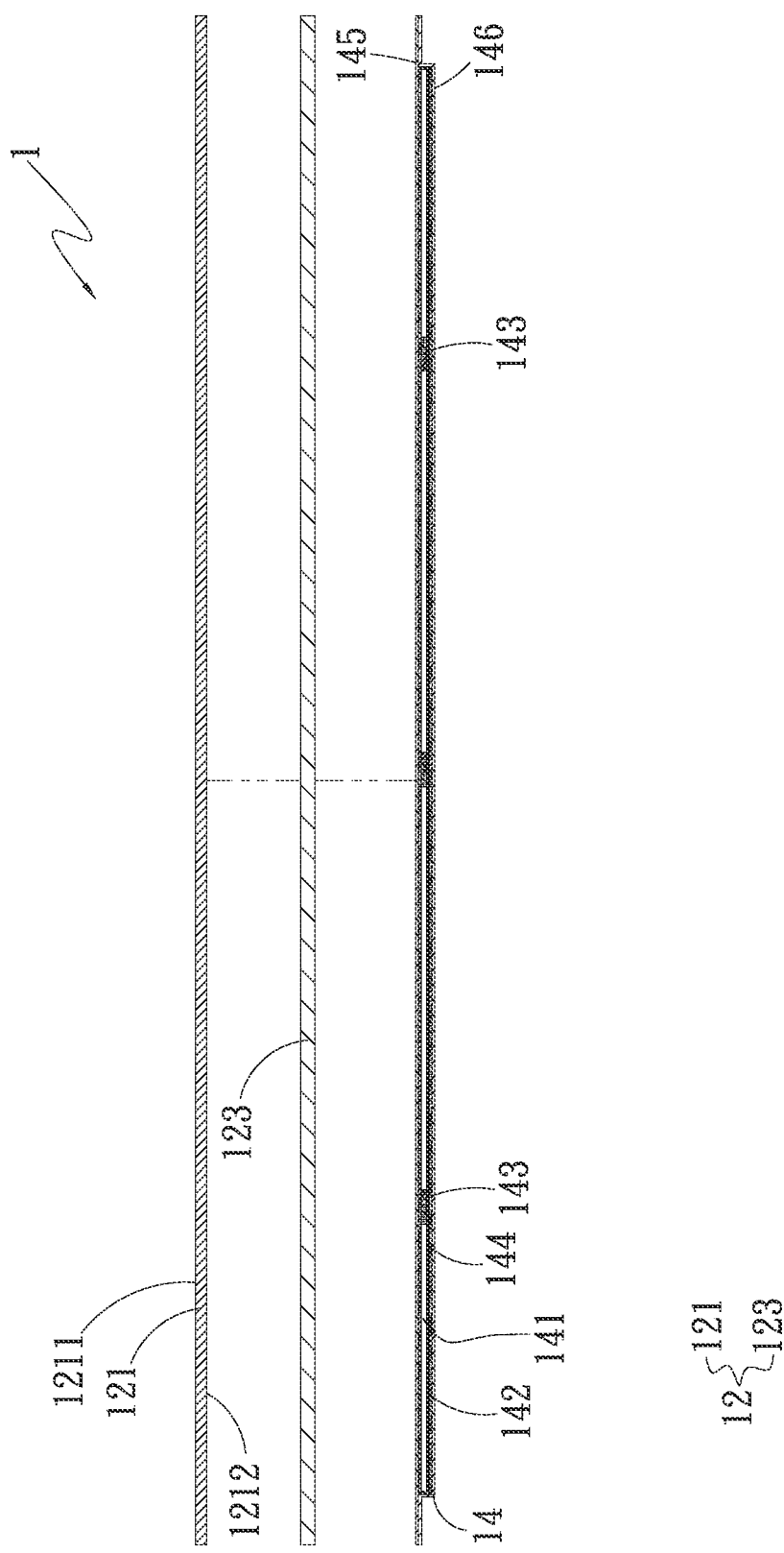
FIG. 3B is a sectional exploded view of the first embodiment of the present invention.

Please refer to FIGS. 1 and 2 and supplementally to FIGS. 3A and 3B. FIG. 1 is a perspective exploded view of a first embodiment of the present invention. FIG. 2 is a perspective assembled view of the first embodiment of the present invention. FIG. 3A is a sectional assembled view of the first embodiment of the present invention. FIG. 3B is a sectional exploded view of the first embodiment of the present invention. According to the first embodiment, the display module 1 with heat dissipation structure of the present invention includes a touch display panel 12 and a vapor chamber 14. The touch display panel 12 includes a touch panel 121 and a display panel 123. The touch panel 121 has a touch face 1211 and a bottom face 1212 opposite to the touch face 1211. The bottom face 1212 of the touch panel 121 is assembled with one face of the display panel 123 to form the touch display panel 12. The touch panel 121 is positioned on upper side of the display panel 123. In other words, the display panel 123 is disposed between the touch panel 121 and the vapor chamber 14. In practice, a protection layer (not shown) can be further disposed on the touch face 1211 to provide protection, anti-scrape and dustproof effects. The protection layer can be a transparent glass or thin membrane.

In this embodiment, the display panel 123 is, but not limited to, a liquid crystal display (LCD) for illustration purposes only. In practice, the display panel 123 can be alternatively a light-emitting diode (LED) display panel or any other type of display panel. The vapor chamber 14 has a first side 145, a second side 146 opposite to the first side 145, a vacuum chamber 141 defined between the first and second sides 145, 146, at least one capillary structure 142 and multiple support columns 143. The first side 145 of the vapor chamber 14 is attached to the other face of the display panel 123. A working fluid 144 is filled in the chamber 141. The working fluid 144 is selected from a group consisting of pure water, inorganic compound, alcohol group, ketone group, liquid metal, coolant and organic compound. In this embodiment, the capillary structure 142 is, but not limited to, a sintered powder body. In practice, the capillary structure 142 can be alternatively a channeled body, metal mesh, fiber or braid. The capillary structure 142 is formed on inner wall of the chamber 141. The support columns 143 are disposed in the chamber 141. The upper and lower ends of the support columns 143 abut against and connect with the upper and lower inner walls of the chamber 141 to support the vapor chamber 14. In this embodiment, the area of the vapor chamber 14 is larger than or equal to the area of the touch display panel 12.

The back frame of the conventional display module is replaced with the vapor chamber 14 of the present invention and the vapor chamber 14 serves to support the touch panel 121 and the display panel 123. Moreover, the vapor chamber 14 has larger heat dissipation area. Accordingly, the heat generated by the electronic component is absorbed by the vapor chamber 14, (for example, absorbed by the second side 146 of the vapor chamber 14 in contact with the electronic component) and is quickly and uniformly spread and dissipated. In this case, the lifetime of the touch display panel 12 can be effectively prolonged.

According to the above arrangement, the vapor chamber 14 is disposed and connected between the touch panel 121 and the display panel 123 to form the display module 1 instead of the back frame of the conventional display module. The vapor chamber 14 can absorb the heat generated by the electronic component and quickly and uniformly spread and dissipate the heat.

Figure 4:
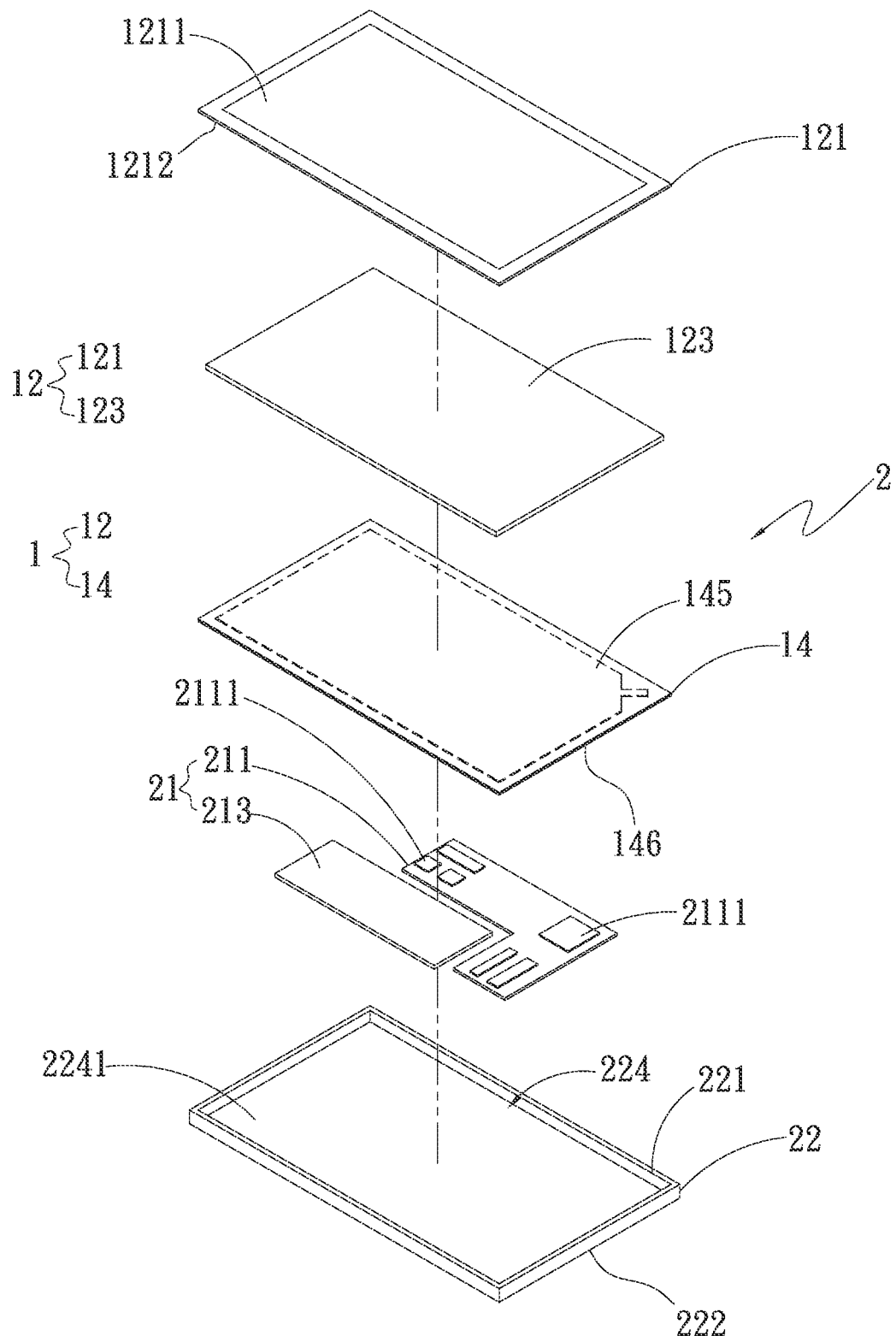
FIG. 4 is a perspective exploded view of a second embodiment of the present invention.
Figure 5:
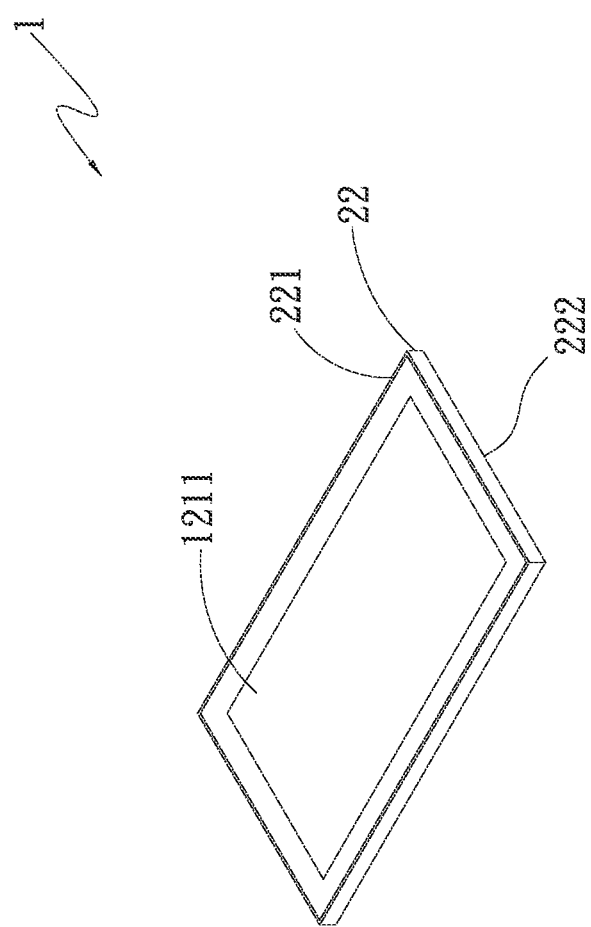
FIG. 5 is a perspective assembled view of the second embodiment of the present invention.

Please now refer to FIGS. 4 and 5. FIG. 4 is a perspective exploded view of a second embodiment of the present invention. FIG. 5 is a perspective assembled view of the second embodiment of the present invention. In the second embodiment, the first embodiment of the display module 1 is applied to a handheld device 2. The handheld device 2 is, but not limited to, an intelligent mobile phone for illustration purposes only. In practice, the handheld device 2 can be alternatively a tablet, iPad, iPad 2 or any other portable touch electronic device.

The handheld device 2 includes a display module 1, an electronic component assembly 21 and a frame body 22. In the second embodiment, the display module 1 is substantially identical to the first embodiment of the display module 1 in structure, connection relationship and effect and thus will not be repeatedly described. One side of the electronic component assembly 21 is attached to the second side 146 of the vapor chamber 14. The other side of the electronic component assembly 21 is disposed on a bottom 2241 of a receiving space 224 of the frame body 22. The electronic component assembly 21 includes a circuit board 211 and a battery 213 (such as a lithium battery). The battery 213 is attached to the second side 146 of the vapor chamber 14. In this embodiment, the circuit board 211 is, but not limited to, a printed circuit board (PCB) for illustration purposes only. The circuit board 211 is arranged in adjacency to the battery 213 on the second side 146. Multiple electronic components 2111 are disposed on the circuit board 211. The electronic components 2111 include a central processing unit (CPU), a graphic processing unit (GPU), a memory (such as flash memory) and other electronic components (such as capacitors, resistors, transistors or IC chips).

The multiple electronic components 2111 are disposed on the circuit board 211 and attached to the second side 146 of the vapor chamber 14. That is, the electronic components 2111 are soldered on the circuit board 211 with one end face attaching to the second side 146 of the vapor chamber 14. For example, one end face of the CPU (or the GPU or IC chips) is attached to the second side 146. The vapor chamber 14 with larger heat dissipation area can absorb the heat generated by the CPU (or GPU) and quickly and uniformly spread and dissipate the heat. Accordingly, the heat will not accumulate around the heat source (such as the CPU or GPU) of the intelligent mobile phone (the handheld device 2).

Figure 6A:
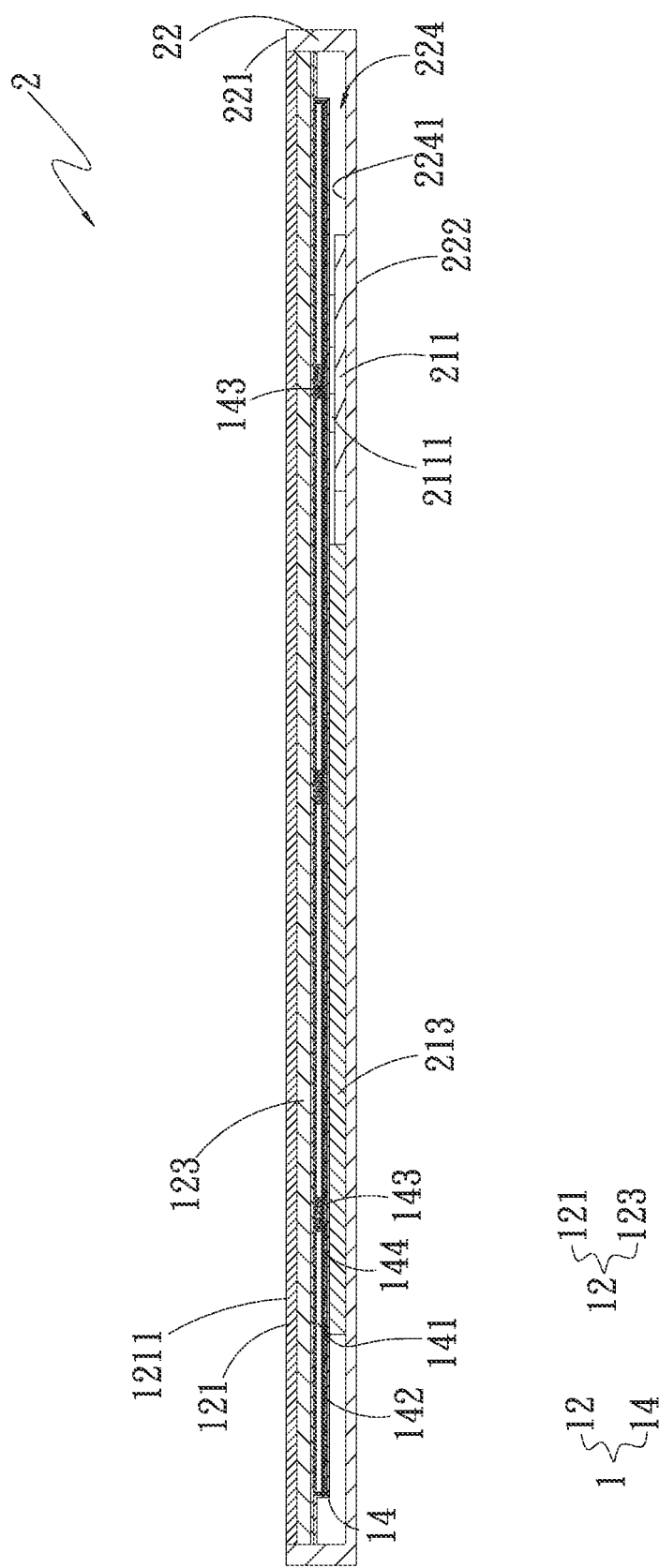
FIG. 6A is a sectional assembled view of the second embodiment of the present invention.
Figure 6B:
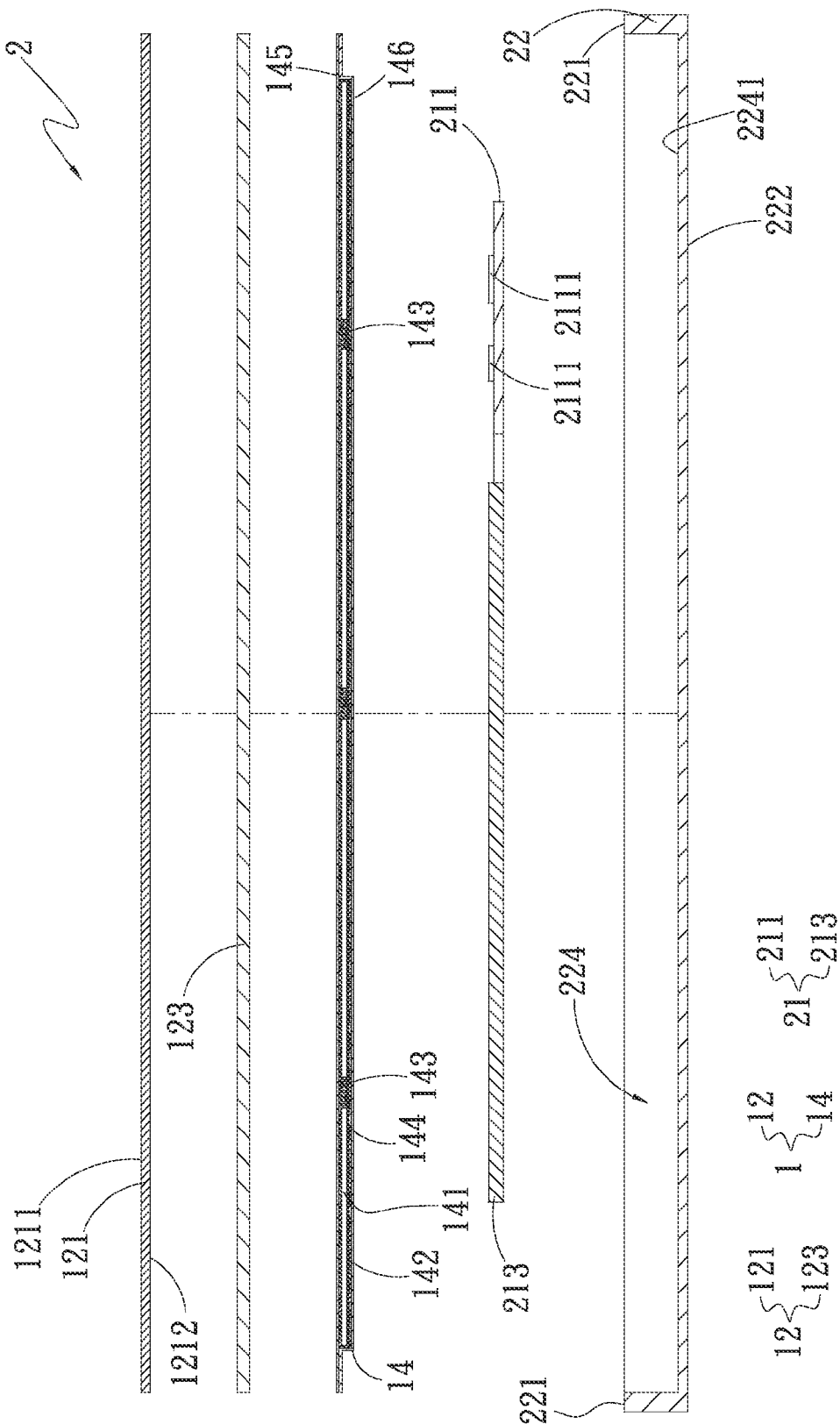
FIG. 6B is a sectional exploded view of the second embodiment of the present invention.

Please now refer to FIGS. 4, 6A and 6B. The frame body 22 has a top section 221 and a bottom section 222 defining the receiving space 224. One side of the frame body 22 is recessed to form the receiving space 224 for receiving the electronic component assembly 21 and the display module 1. That is, the electronic component assembly 21 is positioned on the bottom side 2241 of the receiving space 224 (the inner side of the bottom section 222). The vapor chamber 14 of the display module 1 is positioned between the electronic component assembly 21 and the display panel 123 in the receiving space 224. The touch face 1211 of the touch panel 121 is flush with the top section 221 of the frame body 22 for a user to touch and operate.

When the electronic component 2111 (such as the CPU or GPU) on the circuit board 211 and the battery 213 generate heat, the second side 146 of the vapor chamber 14 absorbs the heat of the CPU and the battery 213 and quickly and uniformly spreads the heat over the entire vapor chamber 14 with larger heat dissipation area. Also, the slight heat generated by the display panel 123 is absorbed by the first side 145 of the vapor chamber 14 and quickly and uniformly spread over the entire vapor chamber 14 to dissipate. In this case, the heat will not accumulate around the CPU (or GPU) and the battery 213 in the handheld device 2. In other words, the heat will not locally accumulate in the handheld device 2 and the lifetime of the touch display panel 12 can be effectively prolonged. Moreover, when a user holds and uses the handheld device 2, the user will feel more comfortable.

According to the above, the display module 1 with heat dissipation structure of the present invention is applied to the handheld device 2. The back frame of the conventional display module is replaced with the vapor chamber 14 of the display module 1. The vapor chamber 14 can absorb the heat and quickly and uniformly spread the heat to dissipate. In this case, the lifetime of the touch display panel 12 is prolonged and a user can use the handheld device more comfortably.

In conclusion, in comparison with the conventional device, the present invention has the following advantages:
1. The heat generated by the handheld device can be quickly and uniformly spread and dissipated.
2. The back frame of the conventional display module is replaced with the vapor chamber of the display module of the present invention. The vapor chamber can absorb the heat and quickly and uniformly spread the heat to dissipate.
3. The heat will not accumulate around the heat source of the handheld device.
4. A user can hold and use the handheld device more comfortably.

The present invention has been described with the above embodiments thereof and it is understood that many changes and modifications in the above embodiments can be carried out without departing from the scope and the spirit of the invention that is intended to be limited only by the appended claims.

What is claimed is:

1. A display module with heat dissipation structure, comprising:
   a touch display panel including a touch panel and a display panel, the touch panel having a touch face and a bottom face opposite to the touch face, the display panel having an upper face and a lower face, the bottom face of the touch panel being connected with the upper face of the display panel, the touch panel being positioned on upper side of the display panel; and
   a sealed vapor chamber comprising an upper cover and a lower cover that are closed to each other to form the vapor chamber, the vapor chamber having a first side and a second side opposite to the first side, the first side of the vapor chamber being an outer side of the upper cover and attached to the lower face of the display panel, the second side of the vapor chamber being an outer side of the lower cover.

2. The display module with heat dissipation structure as claimed in claim 1, wherein the vapor chamber further has a vacuum chamber and at least one capillary structure, a working fluid being filled in the chamber, the capillary structure being formed on inner wall of the chamber.

3. The display module with heat dissipation structure as claimed in claim 2, wherein the vapor chamber further has multiple support columns disposed in the chamber, upper ends of the support columns abutting against and connecting with upper inner wall of the chamber, lower ends of the support columns abutting against and connecting with lower inner wall of the chamber.

4. The display module with heat dissipation structure as claimed in claim 2, wherein the vapor chamber has an area larger than or equal to an area of the touch display panel.

5. A handheld device comprising:
   a display module including a touch display panel and a sealed vapor chamber, the touch display panel including a touch panel and a display panel, the display panel being disposed between the touch panel and the vapor chamber, the touch panel having a touch face and a bottom face opposite to the touch face, the display panel having an upper face and a lower face, the bottom face of the touch panel being attached to the upper face of the display panel, the touch panel being positioned on upper side of the display panel, the vapor chamber comprising an upper cover and a lower cover that are closed to each other to form the vapor chamber, the vapor chamber having a first side and a second side opposite to the first side, the first side of the vapor chamber being an outer side of the upper cover and attached to the lower face of the display panel, the second side of the vapor chamber being an outer side of the lower cover;
   an electronic component assembly, one side of the electronic component assembly being attached to the second side of the vapor chamber; and
   a frame body having a receiving space, one side of the frame body being recessed to form the receiving space for receiving the electronic component assembly and the display module, the other side of the electronic component assembly being attached to a bottom side of the receiving space.

6. The handheld device as claimed in claim 5, wherein the electronic component assembly includes a circuit board and a battery, multiple electronic components being disposed on the circuit board and correspondingly attached to the second side of the vapor chamber, the battery being attached to the second side of the vapor chamber in adjacency to the circuit hoard.

7. The handheld device as claimed in claim 6, wherein the vapor chamber has a vacuum chamber and at least one capillary structure, a working fluid being filled in the chamber, the capillary structure being formed on inner wall of the chamber.

8. The handheld device as claimed in claim 7, wherein the vapor chamber further has multiple support columns disposed in the chamber, upper ends of the support columns abutting against and connecting with upper inner wall of the chamber, lower ends of the support columns abutting against and connecting with lower inner wall of the chamber.

9. The handheld device as claimed in claim 8, wherein the frame body has a top section and a bottom section, the touch face of the touch panel being flush with the top section of the frame body.

10. The handheld device as claimed in claim 8, wherein the vapor chamber has an area larger than or equal to an area of the touch display panel.

* * * * *